UNITED STATES PATENT OFFICE.

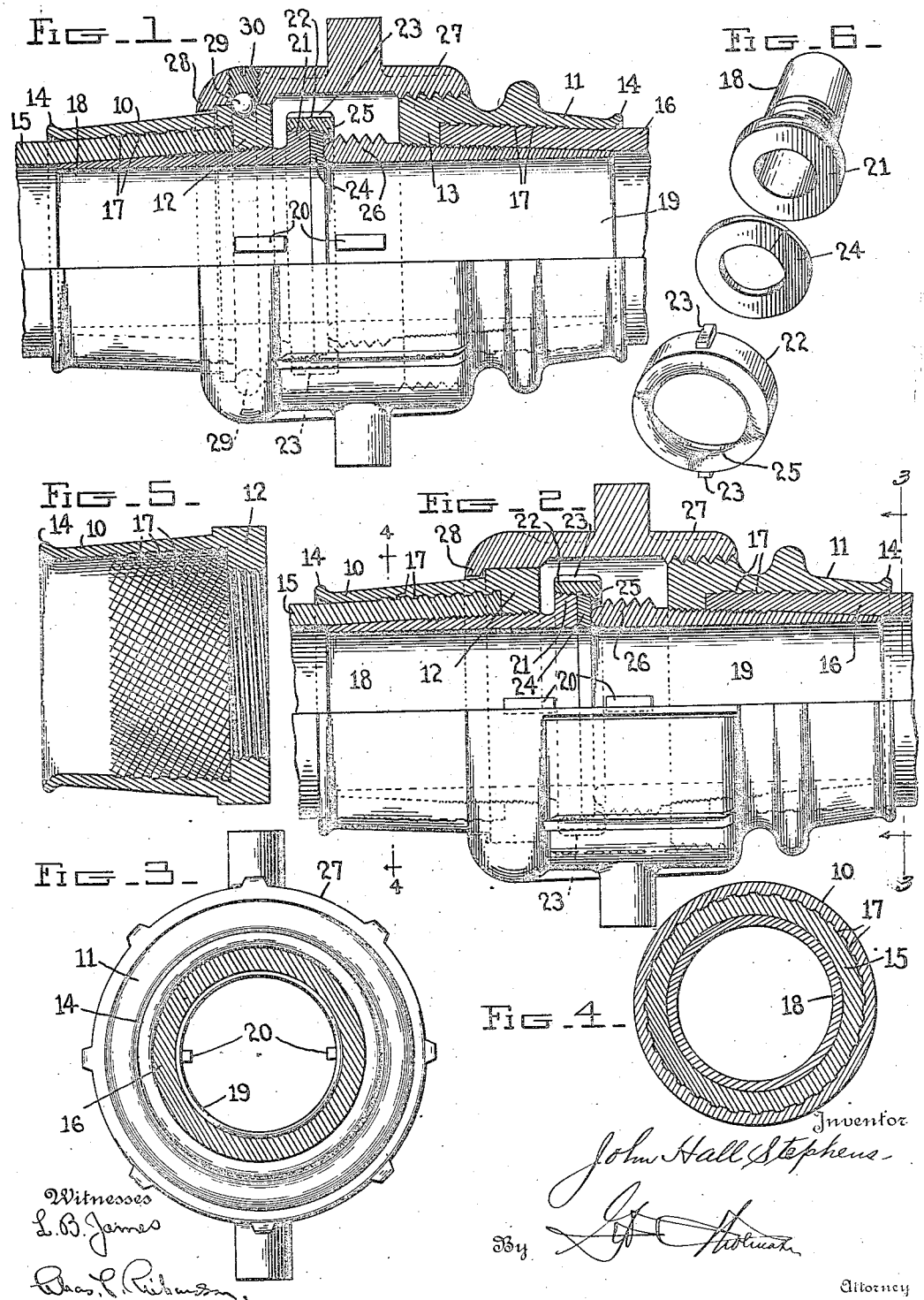

JOHN HALL STEPHENS, OF VERNON, TEXAS.

HOSE-COUPLING.

1,175,834.      Specification of Letters Patent.      Patented Mar. 14, 1916.

Application filed October 1, 1914. Serial No. 864,517.

*To all whom it may concern:*

Be it known that I, JOHN HALL STEPHENS, a citizen of the United States, residing at Vernon, in the county of Wilbarger and State of Texas, have invented certain new and useful Improvements in Hose-Couplings, of which the following is a specification.

This invention relates to hose couplings. One object of the invention is to provide a durable, strong and efficient coupling designed to couple light or heavy hose sections together without undue wear at the coupling connection, and which may be readily and quickly assembled and disassembled.

Another object resides in the provision of a hose coupling embodying among other characteristics a pair of coupling members which are designed to be suitably connected together by means which has swiveled connection with one of the coupling members and which swiveled connection may be provided for without necessitating the contraction of the metal of the connecting means, and which obviates the consequent necessity of expanding the metal of the connecting means if it be desired to disconnect the same from the coupling members.

With the above and other objects in view, the present invention consists in the combination and arrangement of parts to be hereinafter more fully described, illustrated in the accompanying drawings, and particularly pointed out in the appended claims, it being understood that changes may be made in the form, proportion, size and minor details without departing from the spirit or sacrificing any of the advantages of the invention.

In the drawings: Figure 1 is a view partly in longitudinal section and partly in elevation illustrating one form of my invention. Fig. 2 is a similar view illustrating another form of the invention. Fig. 3 is a transverse sectional view on the line 3—3 of Fig. 2. Fig. 4 is a transverse sectional view on the line 4—4 of Fig. 2. Fig. 5 is a detail sectional view of one of the thimbles. Fig. 6 embraces a series of perspective views on a small scale of one of the thimbles and the collar which is adapted to be secured thereto for holding the washer against the inner end of the thimble.

Referring now more particularly to the accompanying drawings, the reference characters 10 and 11 indicate coupling members, each having its inner end thickened to form internal and external shoulders 12 and 13, each threaded internally and having its outer end bell-shaped or flared as indicated at 14, so as not to cut or injure the hose sections 15 and 16 which are adapted to be fitted in the coupling members with their inner ends adjacent to or in engagement with the respective shoulders 12 and 13 of the coupling members.

The coupling members 10 and 11 preferably taper and on their inner faces they are preferably provided with diagonally arranged intersecting shallow grooves which form diamond-shaped projections 16 which are adapted to bite into the outer surfaces of the hose sections 15 and 16 without danger of cutting entirely through the same, and yet providing for such a roughened or serrated face as will insure against slipping of the hose sections 15 and 16 when the latter are clamped in the coupling members 10 and 11 by the respective thimbles 18 and 19.

The thimbles 18 and 19 are preferably fitted into the coupling members 10 and 11 from the inner ends of the coupling members and are adapted to extend into the hose sections so as to clamp the latter between the thimbles and the respective coupling members. The thimbles 18 and 19 are preferably inserted into the coupling members for the purpose stated by a rotative movement, they preferably having screw threaded fit with the screw threaded shoulders 12 and 13 of the coupling members, the screw threads thereof also extending into the hose sections so as to facilitate binding or clamping of the hose sections between them and the coupling members. The extreme outer ends of the thimbles have their outer faces preferably smooth so as to facilitate ready insertion thereof into the hose sections and in order to fit the thimbles within the coupling members and the hose sections the interior of each thimble is preferably provided with lugs 20 to take a suitable wrench (not shown) so that the thimbles may be readily screwed into and out of the coupling members and the hose sections.

The inner end of the thimble 18 is provided with a screw threaded shoulder 21 with which a collar 22 may have a threaded working fit having lugs 23 with which a suitable wrench (not shown) may operate to connect and disconnect said collar with and from said screw threaded shoulder 21. The purpose of this collar 22 is to secure a leather, rubber or other suitable split washer 24 against the inner end of the thimble 18 and against accidental displacement when the coupling members are separated. The collar 22 has a rounded or beveled annular lip 25 adapted to engage the outer face of the gasket or washer 24. The thimble 18 thus carries the washer against accidental displacement when the parts are disassembled and holds the washer in such position that when the parts are assembled the inner end of the thimble 19 may engage snugly with the same to prevent leakage. The inner end of the thimble 19 is preferably somewhat thickened, as at 26, and screw threaded, so that, if desired, it may be connected to a hydrant or the like.

The coupling members may be connected by suitable means, such as a nut 27 which has screw threaded connection at one end with the thimble 11 and which has swiveled connection at its opposite end with the coupling member 10. This nut 27 is provided with an annular shoulder 28 which is adapted to overhang the shoulder 12 when the parts are assembled. To this end the coupling member 10 is preferably positioned by inserting it from the right hand end of the nut 27 inwardly to present its shoulder 12 against the shoulder 28, said shoulder 28 having relatively close fit both with the shoulder 12 and the body of the coupling member 10, the spaces between them being exaggerated in the drawing in order to clearly illustrate the invention. By virtue of the sleeve 19 being rigidly secured to the coupling member 11 and the nut 27 being also rigidly secured to the coupling member 11 and the sleeve 18 being held against the washer 24 carried by the sleeve 19, there is no danger of accidental inward movement of the coupling member 10.

The shoulder 12 of the coupling member 10 and the nut 27 may be provided with coinciding grooves to form a raceway for bearing balls 29 which may be inserted into the raceway through an opening which is normally closed by a nut 30. These bearing balls facilitate a free and easy rotative swiveled connection between the nut 27 and the coupling member 10, as shown in Fig. 1, but these balls may be dispensed with, if desired, as is apparent from the structure shown in Fig. 2.

What is claimed is:—

1. A hose coupling comprising coupling members, a clamping thimble in each of said coupling members, each coupling member being internally serrated and against which the hose sections are clamped upon insertion of the thimbles in the coupling members, each thimble having an external tapering portion and also an external screw threaded portion, one of the thimbles having a radial annular screw threaded shoulder, a collar having threaded working fit with said shoulder, a packing ring held permanently against said shoulder by said collar, and a nut having connection with said coupling members.

2. A hose coupling comprising coupling members to receive hose sections, a clamping thimble screwed into each hose section to expand the hose section against the respective coupling member, one of the thimbles having an external annular screw threaded shoulder, a collar having working fit with said shoulder, a packing ring held permanently against said shoulder by said collar, and a nut having swiveled connection with one of the coupling members and screw threaded connection with the other coupling member.

3. A hose coupling comprising coupling members to receive hose sections, each coupling member having an internal annular screw threaded shoulder, a thimble having screw threaded connection with the annular shoulder of each coupling member and adapted to be inserted into the respective hose sections to clamp the latter within the respective coupling members, one of the thimbles having an external annular screw-threaded shoulder, a collar having threaded working fit with said latter screw threaded shoulder, a packing ring held permanently against said latter shoulder by said collar, and a nut having swiveled connection with one of the coupling members and screw threaded connection with the other coupling member.

4. A hose coupling comprising coupling members, each having an internal annular screw threaded shoulder, thimbles having screw threaded connection with the respective screw threaded annular shoulders of the coupling members and adapted to fit within the coupling members to clamp the respective hose sections between them and the coupling members, a packing ring carried permanently by one of the thimbles for engagement by the opposite thimble to form a water-tight joint between the thimbles, and a coupling nut between the coupling members.

In testimony whereof, I affix my signature in presence of two witnesses.

JOHN HALL STEPHENS.

Witnesses:
J. V. TOWNSEND,
SEBE NEWMAN.